US012692614B2

(12) United States Patent
McDonald et al.

(10) Patent No.: US 12,692,614 B2
(45) Date of Patent: Jul. 28, 2026

(54) METHOD AND APPARATUS FOR PLATING METAL AND METAL OXIDE LAYER CORES

(71) Applicant: Atlas Magnetics, Reno, NV (US)

(72) Inventors: John Othniel McDonald, Reno, NV (US); Zachary Zimits, Reno, NV (US); Daniel Smallwood, Coco Beach, FL (US)

( * ) Notice: Subject to any disclaimer, the term of this patent is extended or adjusted under 35 U.S.C. 154(b) by 0 days.

(21) Appl. No.: 18/822,369

(22) Filed: Sep. 2, 2024

(65) Prior Publication Data

US 2024/0417876 A1 Dec. 19, 2024

Related U.S. Application Data

(62) Division of application No. 17/900,803, filed on Aug. 31, 2022, now Pat. No. 12,077,877.

(51) Int. Cl.

| | |
|---|---|
| ***C25D 3/12*** | (2006.01) |
| ***C25D 3/20*** | (2006.01) |
| ***C25D 3/44*** | (2006.01) |
| ***C25D 5/10*** | (2006.01) |
| ***C25D 7/00*** | (2006.01) |
| ***H01F 3/00*** | (2006.01) |
| ***H01F 41/26*** | (2006.01) |

(52) U.S. Cl.
CPC ................ *C25D 3/12* (2013.01); *C25D 3/20* (2013.01); *C25D 3/44* (2013.01); *C25D 5/10* (2013.01); *C25D 7/001* (2013.01); *H01F 3/00* (2013.01); *H01F 41/26* (2013.01)

(58) Field of Classification Search
None
See application file for complete search history.

(56) References Cited

U.S. PATENT DOCUMENTS

2017/0330657 A1* 11/2017 Arnold .................. C25D 5/022

* cited by examiner

*Primary Examiner* — Wojciech Haske

(57) ABSTRACT

An apparatus and method for plating magnetic cores by periodically transferring a plate directly back and forth between a metal plating environment and an insulation deposit environment. This direct metal to insulation to metal plating is enabled by a nano-scale insulation layer that provides an imperfect coverage of the metal layer while still keeping sufficient insulation to prevent eddy current formation—even during high-frequency current applications. Therefore, this invention enables the practical creation of magnetic cores having layers with widths even under one nanometer and can generate cores having a layer scale that can be varied to suit a variety of uses in the microelectronic industry.

4 Claims, 13 Drawing Sheets

METHOD AND APPARATUS FOR PLATING METAL AND METAL OXIDE LAYER CORES

CROSS REFERENCE TO RELATED APPLICATIONS

The present application is a divisional of patent application Ser. No. 17/900,803 and hereby incorporates it by reference in its entirety.

BACKGROUND

The field of the invention relates to semiconductor manufacturing and, more specifically, to manufacturing magnetic cores for circuit components, including integrated magnetic components.

Magnetic components have a magnetically permeable core which is designed in part to guide generated magnetic flux lines. Each material has a specific amount of magnetic flux per area of material it can handle before becoming saturated. The saturation point is known as the $B_{SAT}$ limit.

Due to the $B_{SAT}$ limit, the amount of magnetic material making up the core must be enough so that the material has the required area to avoid becoming saturated. Because different materials have different $B_{SAT}$ values, using different materials can result in different core sizes (and thus component sizes). For example, ferrites generally have lower $B_{SAT}$ values than metals, so when this holds true, a ferrite core must be much larger than a metal core to handle the same amount of magnetic flux.

Further, eddy currents are created when magnetic flux lines are in the core. These eddy currents will build up heat which may have a detrimental effect on the operation of the component by, for instance, reducing the power efficacy of the core. The higher the frequency, the smaller but more intense the eddy currents will become. Different materials handle the eddy currents differently; ceramics, like ferrites, make the formation of eddy currents difficult.

However, metals may allow eddy currents to form essentially unimpeded. As such, eddy currents will start to generate inefficiencies in metal cores at around ten to fifteen microns of core thickness. Therefore, metal cores often are composed of layers of insulation placed between layers of metals to prevent the proliferation of eddy currents. The insulation adds to the cost of the metal cores.

It is the production of insulating layers that drives the cost increase. Insulation layers typically require increasing the steps to produce the final core by requiring around thirteen steps, which include two dry film placement steps. The increased number of steps drives up the cost and the time required to plate the full core.

Insulation layers may also be made by a Chemical Vapor Deposition (CVD) process or a Physical Vapor Deposition (PVD) process, and both these processes increase the cost and time to make the core significantly as well. Both CVD and PVD require expensive specialized equipment and up to an hour of plating time to deposit each micron of nickel-iron or other core material. The CVD and PVD processes, typically, are also not compatible with semiconductor plastic as they rely on high temperature deposition.

As for most metal core applications, insulation layers are necessitated, and as those layers are limited by current production methods, then the layered core will be more expensive than an unlayered core. However, in most components, and especially in high-frequency components that have more intense eddy currents, layers are extremely beneficial as they impede the eddy current pathways by raising the resistance in the core. Core impedance will raise the power efficiency of the component by reducing core power losses caused by eddy currents. Therefore, as high-frequency capable components are desirable in the industry, it is important to create a low-cost, quick, and scalable method of producing magnetic cores capable of use in such components.

The following United States Patents are incorporated in full by reference:

U.S. Pat. No. 9,439,295 B2 Electrically insulating elements and electrically conductive elements formed from elements having different oxidation behaviors invented by Nathan S. Lazarus; Christopher D. Meyer; and Sarah S. Bedair.

U.S. Pat. No. 7,262,132 B2 Metal plating using seed film invented by Eugene P. Marsh The following research paper is incorporated in full by reference:

Wang, Wei-Lin, et al. "The effects of plating current and rotation speed on the microstructural properties of electrochemical plated Cu films." 2016 5th International Symposium on Next-Generation Electronics (ISNE). IEEE, 2016.

BRIEF SUMMARY OF THE INVENTION

The preferred embodiments of the present invention relate to methods for depositing multiple metal layers and metal insulation layers for the purpose of manufacturing a high resistivity magnetic core for inductors, transformers, and other magnetic components. The method of the present invention produces small high-frequency capable cores by a novel plating method. This method enables metal cores with layers of thickness on the atomic scale capable of handling high frequencies to be made cheaply in a matter of minutes and at a large scale.

In general embodiments, a laminated metal core comprising at least two metal conductive layers and at least one nanoscale thin insulative layer is manufactured by a direct layer-on-layer plating method. This method allows the number of layers in the core to reach into the thousands and still be produced cheaply and quickly-without any extra steps over a single-layer core, beyond simply direct layer-on-layer plating according to an original dry film pattern. For example, the total depositing time for a core having 4000 layers will be under two hours, and many cores can be simultaneously plated according to the plating method of the present invention. This time is significantly faster than PVD and CVD methods which require up to an hour per micron of the core layer, and has significantly fewer steps than plating a layered core wherein layers require intermediary steps to be plated.

The method of the present invention will be referred to as Duty Cycle Plating. Here there are two environments: the first is a metal plating bath, and the second is an insulation deposit environment. Particular insulation deposit environments include an oxidizing environment or a silicon Chemical Combustion Vapor Deposition environment (CCVD). The object which is to be plated will be transferred back and forth through the two environments. A copper-coated plastic plate is passed through an environment and then directly passed through a subsequent environment, and this process is repeated until a desired number of core layers is formed.

In a preferred method, a layered core comprising of metal and insulation layers such as nickel or nickel-iron and nickel-oxide layers; or nickel, nickel-iron, and silica layers, are manufactured by an electroplating bath process where a plate containing a palatable surface is fully immersed into a plating bath to plate a metal layer, and it is then brought out of the bath to be immersed in an insulative environment according to the insulation layer to be deposited. This process repeats to form the layers of the core.

A preferred apparatus to enable this process consists of a series of plates hanging on a chain loop with the lower portion of the loop in a plating bath and an upper portion of the loop in an insulation depositing environment such as an ozone environment or a CCVD receiving environment. The chain loop is pulled so that the plates cycle through the environments in series.

The preferred method of fully submerging a plate may be achieved by other means, not limited to but including, arranging a series of plates that are to be plated along the circumference of a larger circular host plate's flat surface; placing the larger host plate so that it is partially submerged into a plating bath with an upper portion enveloped by an insulation environment; and rotating the large circular plate so that it passes each individual smaller plate through each plating environment. In this method, the large plate can be rotated up to 300 rpm, enabling rapid layer and thus core formation. By arranging the small plates along the circumference of the large plate's flat surface, deformities due to the non-uniformity of speed across the host plate surface are significantly reduced.

The spinning plate methodology may be modified so that an individual plate to be plated onto is itself partially submerged in a plating environment with a remaining portion enveloped by an insulation deposit environment. So, here it is not a series of plates being fully submerged but a single plate being partially submerged and partially enveloped simultaneously. This method also provides a means to form layers rapidly but is subject to deformity due to the non-uniformity of rotational speed.

With a loop or rotational plate set-up, additional stations can be added to the loop or plate, including a rinsing or drying station, and both can be added to the cycle so that any plating bath rising with the plates due to surface tension of the bath is rinsed off and the plate enters the insulation plating environment dry. These additional stations need not be used but may be used to improve the efficiency of the insulation depositing. These additional stations may also be located inside an insulation deposit environment.

Direct transfer from the plating bath to the insulation deposit environment and back is enabled by the insulative layer composition. The insulative layer formed is imperfect in its coverage, having a random assembly of through-holes and itself being only several molecules thick. These physical traits of the insulative core layers allow metal to be plated directly on and through the insulative layer: while allowing the insulative layer to serve as an insulator capable of handling the strong eddy currents which derive from component use with high-frequency current. The preferred insulators are silica and oxide. The imperfect plating is enabled by passing the plate through a suitable environment. For oxide formation, this is an environment where the air in the environment reacts with the metal layer to create an oxide layer as the metal layer passes through. For silica, this is an environment where the silica falls like snow onto the metal layer from the combustion reaction of the CCVD process as the metal layer passes through.

The insulation layer of the core, therefore, is an insulator that is capable of being plated so that it is several molecules thick, has imperfect coverage, is plated quickly, and is a strong enough insulator to reduce eddy current significantly.

These methods provide a means of directly cycling a plate through a series of plating environments repeatedly and, as such, rely on the ability of the plated metal to plate directly on and through an insulative core layer. Insulation layers made of oxide or silica are optimum as they can provide imperfect layer coverage while retaining strong insulative properties, all while remaining cheap to manufacture. Therefore, duty cycle plating is a method of plating thin layered magnetic cores capable of handling high-frequency applications in a cheap and quick manner by direct layer-on-layer plating.

DETAILED DESCRIPTION OF THE INVENTION

Figure 1:
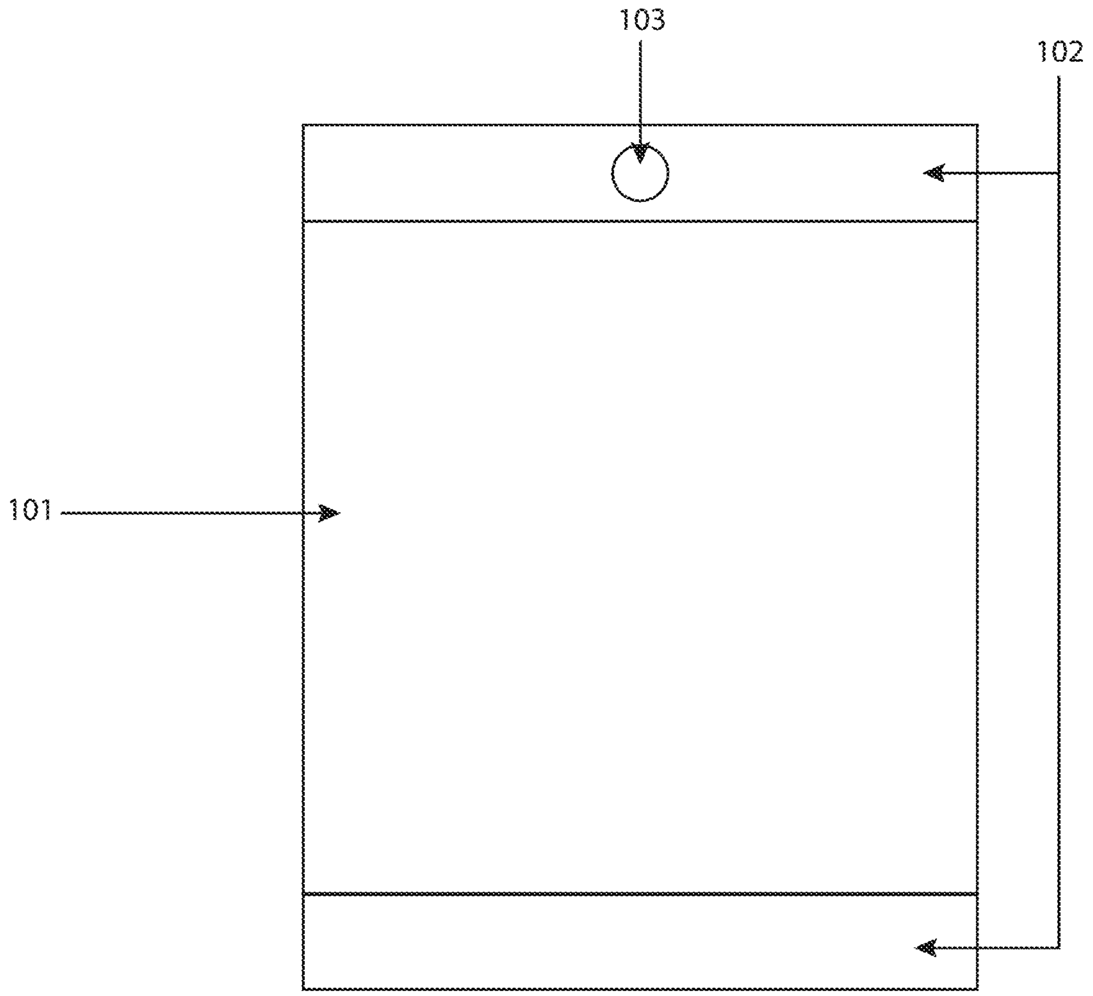
FIG. 1 shows a patterned plate being operationally attached to a host plate.

In the preferred embodiments of the present invention, a magnetic core is composed of a series of repeating metal and insulation layers. A deposit process deposits the metal by electroplating, and the insulator is formed on the metal by an insulation deposit process involving either the reaction of the metal with oxygen in an oxidizing environment or the deposition of silica by a chemical combustion vapor deposition process (CCVD). A subsequent metal layer is then formed directly on the insulation layer. Given the direct metal on insulation plating and the method of cycling rapidly between plating environments, the insulating and metal depositing layer process can be instantly and directly repeated so that a four-thousand-layer and multi-micron thick core can be created in less than two hours.

Modern cores are expensive to produce, requiring significantly elevated number of steps over unlayered cores, and thus increases in cost and time to produce. Yet, the present invention provides a cheap, quick, and scalable metal core infused with thin but strong insulative layers built with an innovative method as a solution to these problems.

"Specific eddy current loss", $P_{EC,SP}$ which is the power loss per unit volume for lamination thickness less than the skin depth in a magnetic core can be approximated as, $$P_{EC,SP} = \frac{t^2\omega^2B^2}{24\rho_{core}} \quad (1)$$

$$\omega = 2\pi f \quad (2)$$

Where $\rho_{core}$ is the magnetic core resistivity which is the inverse of the conductivity and ω, t, f and B are angular frequency, thickness of the metal lamination layer, frequency, and magnetic induction respectively. As can be seen in (1) eddy current loss is quadratically related to the laminate thickness. This property is the main motivation in this invention; developing a cost-effective chemical batch process giving very large number of very thin layers with magnetic properties separated with much thinner insulator layers resulting in stacking factor very close to 1.

The metal of thin metal layers of the core allows it to handle a high degree of magnetic flux suitable for high-frequency cores, while the thinness ensures that even small eddy currents do not have enough space to form fully before running into the insulation. The use of strong insulators ensures that the eddy currents are sufficiently impeded even though the insulator layer will have imperfect coverage and nanoscale thinness. The imperfect coverage and thinness of the insulator layer allow direct metal to insulation to metal plating without intermediary steps, effectively creating what is more akin to a new material having directional impedance than a traditional layered core. As direct plating requires only a few steps, it is cheap and quick. As the metals, nickel and iron, and the insulators, silica and oxides, of the preferred embodiments are widely available or quick to create, the entire process is low-cost.

In the preferred embodiments, the metal core may be, but is not limited to, nickel, iron, aluminum, cobalt, or an alloy of these metals. The metal core may have layers that are of one metal and other layers which are of other metals. In cores where the insulator is an oxide, it will be an oxide of one of the metal layers; therefore, a nickel and nickel-iron layered core with an oxide-based insulation layer will typically have a nickel-oxide layer. The preferred examples of these cores are: aluminum, aluminum oxide, and nickel-iron layered cores and nickel-iron, nickel, and nickel-oxide layered cores.

The core may have a silica dioxide insulator or may alternate between insulation layer types from oxide to silica. Whether silica or oxide based, as the insulation layers are thin and imperfect, they do not create a core with a resistivity that a core with perfect layers of the same insulator would have. However, the reduction of core resistivity can be offset by increasing the layer count. As the layers increase, the resistivity of the core increases. However, eventually the resistivity will increase the difficulty of plating a metal and will form a layer count limit for the cores. To increase the thickness of the core layers or to improve the core limit layer, copper seed layers can be added after insulation layers.

Oxide is suitable for the invention as a thin and imperfect layer will be plated by simply passing the metal layer through an oxidative environment at speed. This is an extremely quick and low-cost method of plating oxide. Silica is suitable for plating because a thin imperfect layer can be achieved by passing the metal layer through a CCVD plating environment. Both methods of plating the insulation are extremely low cost as they require no additional steps nor even a pause in their respective environments.

To produce the imperfect insulation layers and to enable metal on metal plating, the preferred methods of the present invention provide an electroplating bath, an insulation depositing environment, and a method of quickly cycling through the two plating environments. This creates what is known as a duty cycle. A duty cycle can be defined by the percentage of time that a plate spends in the plating environment. For a two-environment cycle, a fifty percent duty cycle occurs when the amount of time the portion of the device spends in the metal-plating environment and in the oxidizing environment is equal. A one-hundred-percent duty cycle occurs when the plate is completely immersed in the plating bath, and a zero-percent duty cycle occurs when the plate is entirely in the oxidizing environment. Both the one-hundred percent duty cycle and zero percent duty cycle are unlikely to occur in the formation of multi-layer cores; however, they are useful for reference. This allows a seventy-five percent duty cycle to be understood as a cycle where the ratio of time in the plating bath to the time in the insulation deposit environment is 3:1, and for a twenty-five percent duty cycle, that ratio becomes 1:3. Embodiments that incorporate more than two plating environments, such as those creating a multi-metal core, can still be referred to in terms of ratios, for example, a 33-33-33 cycle between three environments is a 1:1:1 ratio.

In the preferred embodiments, a copper-coated plastic plate patterned with dry film photoresist of standard 25 μm, 50 μm, or 100 μm or similar custom thicknesses according to the desired magnetic core shapes will receive the magnetic core layers. This plate can be integrated onto a host plate that will transfer it from one plating environment to another plating environment, or it may serve as a host plate itself. As a host plate, the patterned plate can be made to exist with a portion in a plating environment and a second portion in another plating environment so that by spinning, and not by a full host plate transfer, it can move between environments. The plate may be any shape suited for rotation and travel between two depositing environments; for example, the plate may be round.

In the preferred embodiments of the present invention, the plate receiving metal or insulation layer deposits is moved or rotated from one environment to another, it may be rinsed with $H_2O$, or other suitable liquid, to remove particulates that may have stuck to the surface of the silicon wafer or other devices. This rinsing process may be followed by a drying process, the purpose of which is to remove the water and increase the speed of the oxidation process. To dry the wafer or device, an active drying apparatus such as an apparatus using forced air (by use of an air knife, for example) may be used. Other heated gas besides air may be utilized for the air knife. Further, in the preferred embodiments, the forced air is filtered to remove particulates. Alternatively, or additionally, drying may occur with the help of a heater, an example being an infrared heater. This process may occur through the use of stations in which the plate passes through as it is moved or otherwise rotates through environments.

In a preferred embodiment, referred to as the chain embodiment, the patterned plate 101 is hung by a host plate 102 from a chain using hole 103, as shown in FIG. 1.

Figure 2:
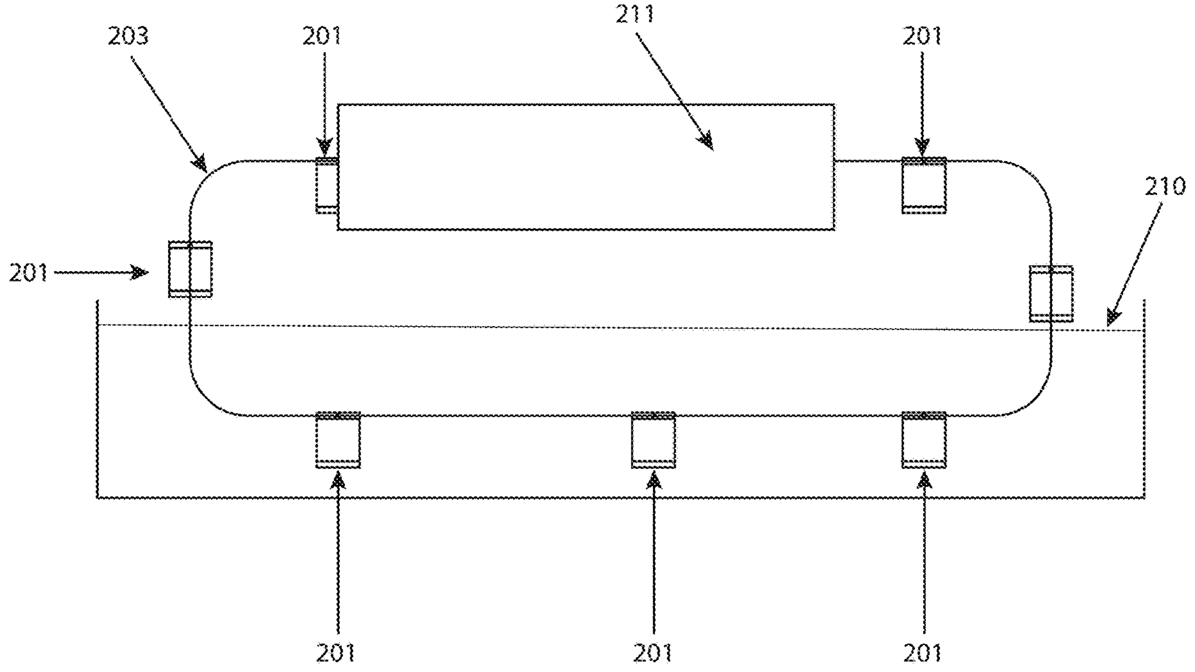
FIG. 2 shows a chain loop apparatus wherein the host plates are operationally attached to the chain, and the chain loops through a plating bath and an imperfect insulator layer deposit environment.

As shown in FIG. 2, chain 203 forms a loop that passes through an electroplating bath 210 and an insulation deposit environment 211. The insulation deposit environment 211 may be an oxide deposit environment or a silica CCVD environment. The chain moves along the loop path so that a host plate and patterned plate apparatus 201 will pass through the respective plating environments: electroplating bath 210 and insulation deposit environment 211. The rate that chain 203 loops depends on the deposit rates of the plating environments and the desired layer thickness. Although there can be a portion of the chain 203 loop within a chambered insulation deposit environment, the entire portion of chain loop 203 out of plating path 210 can be subjected to an oxidizing environment in embodiments that require an oxide insulation layer. The oxidizing environment can be tuned by controlling the humidity, heat, pressure, and oxygen composition of the air around chain loop 203. In the chain embodiment, the number or spacing or both of plates on the chain may vary.

Figure 3:
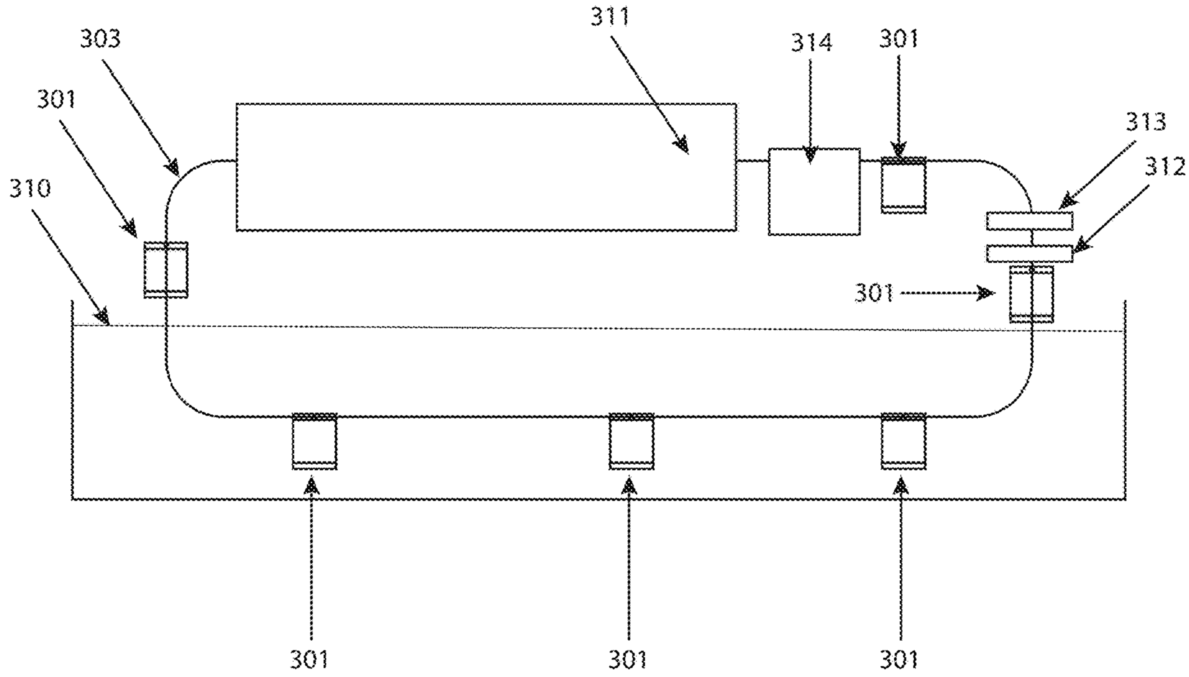
FIG. 3 shows the chain loop of FIG. 2 with the addition of a rinsing station, a drying station, and a heating station.

As shown in FIG. 3 additional stations can be added to the chain loop 303 pathway. Here a rinsing station 312 is placed to rinse plates 301 as they rise from the plating bath 310. It may rinse the plates with pure water or other chemically suitable liquid: removing the plating bath solution from the plate while preserving the newly plated material. After the rinsing station 312 is a drying station 313, which incorporates an air jet to blow off the remaining rinse solution from rinse station 312. After drying station 313 an infrared heater station 312 is shown that heats plate 301, removing any remaining liquid, and helping to prepare it to receive an insulation layer. In FIG. 3 multiple stations are shown; however, not all stations need to be added, and more stations, even of the same type, may be added.

Figure 4:
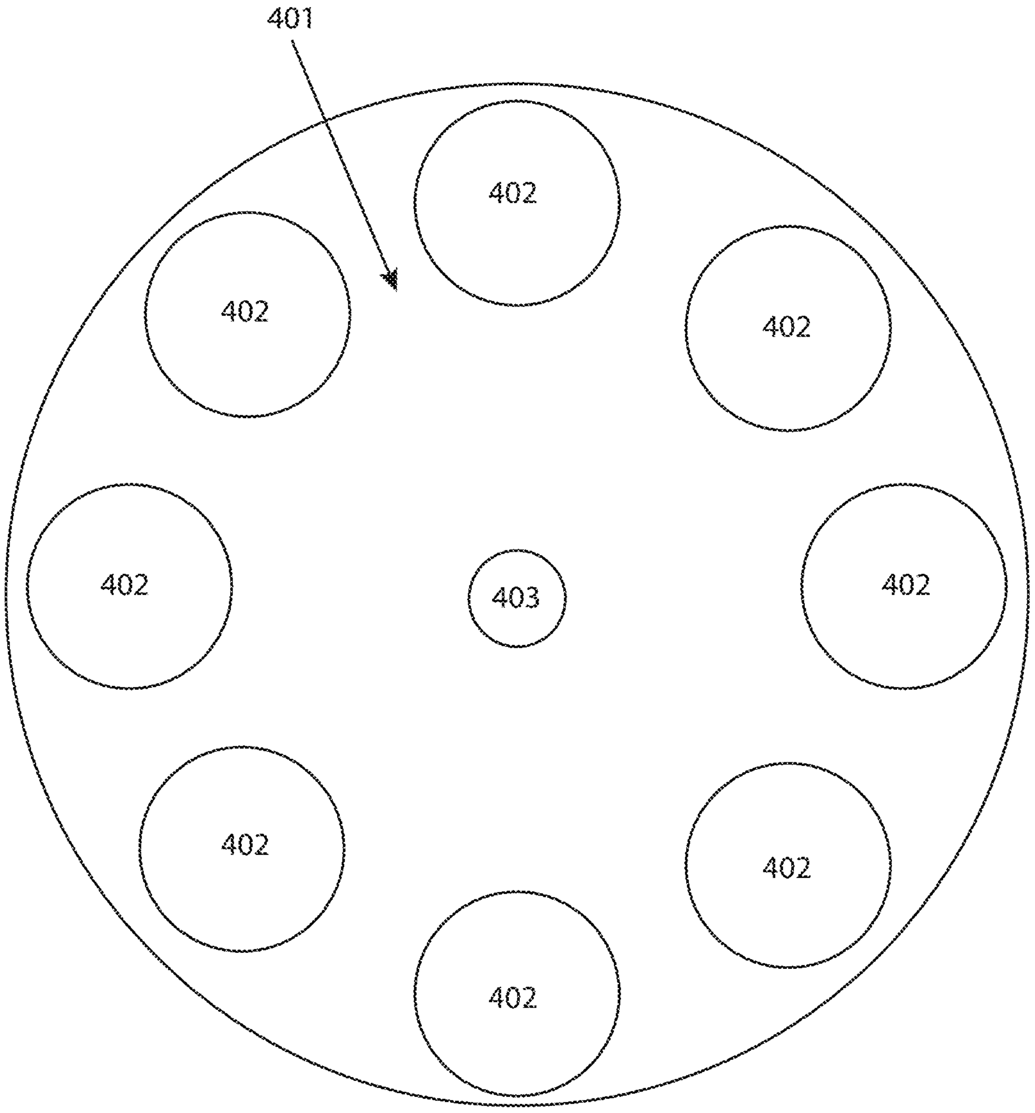
FIG. 4 shows a circular host plate having a series of patterned plates along the circumference of one of the host plate's circular edges.
Figure 5:
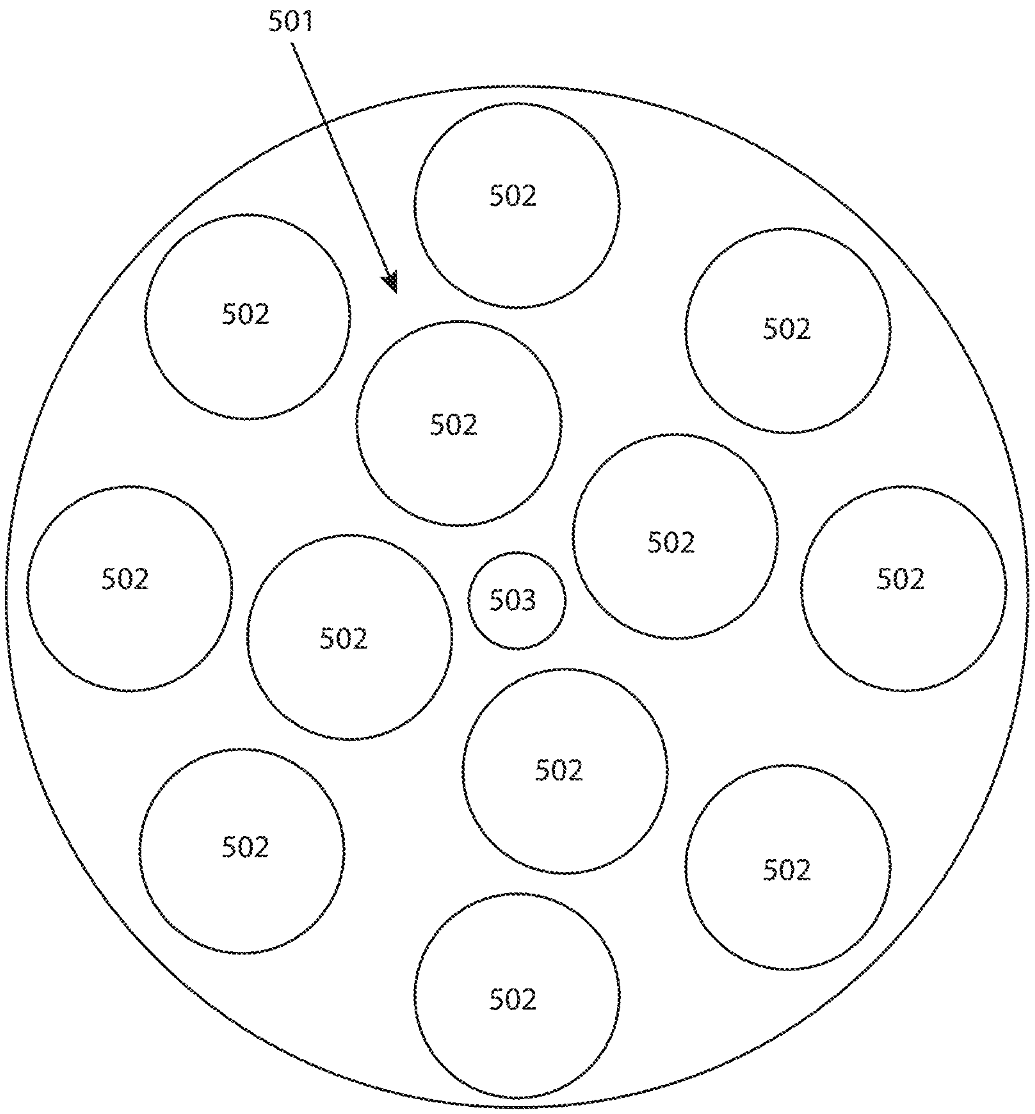
FIG. 5 shows a circular host plate having a plurality of patterned plates which are different distances from the center of the host plate.

In a preferred embodiment, referred to here as a host plate embodiment, a host plate 401 may hold patterned plates 402, as shown in FIG. 4. Here, a host plate 401 is host to several patterned plates 402 placed along the circumference of a circular surface of the host plate 401. The host plate can be attached to a passing device through hole 403 so that the host plate may be spun. The host plate 401 may hold more or less patterned plates 402 than shown. The patterned plates 401 may be placed anywhere along the circular surface of the host plate as long as it does not interfere with the connection of host plate 401 with a rotational device through hole 403. Placing the pattern plates 401 in a manner for which the patterned plates are offset from the center, as shown in FIG. 5, where patterned plates 502 are offset on the surface of host plate 501 will create a non-uniformity between the cores of the patterned plates 502 because they will spin though and rise up out of a plating bath at different speeds. Therefore, it is optimum to keep the patterned plates at a uniform distance from hole 503.

Figure 6:
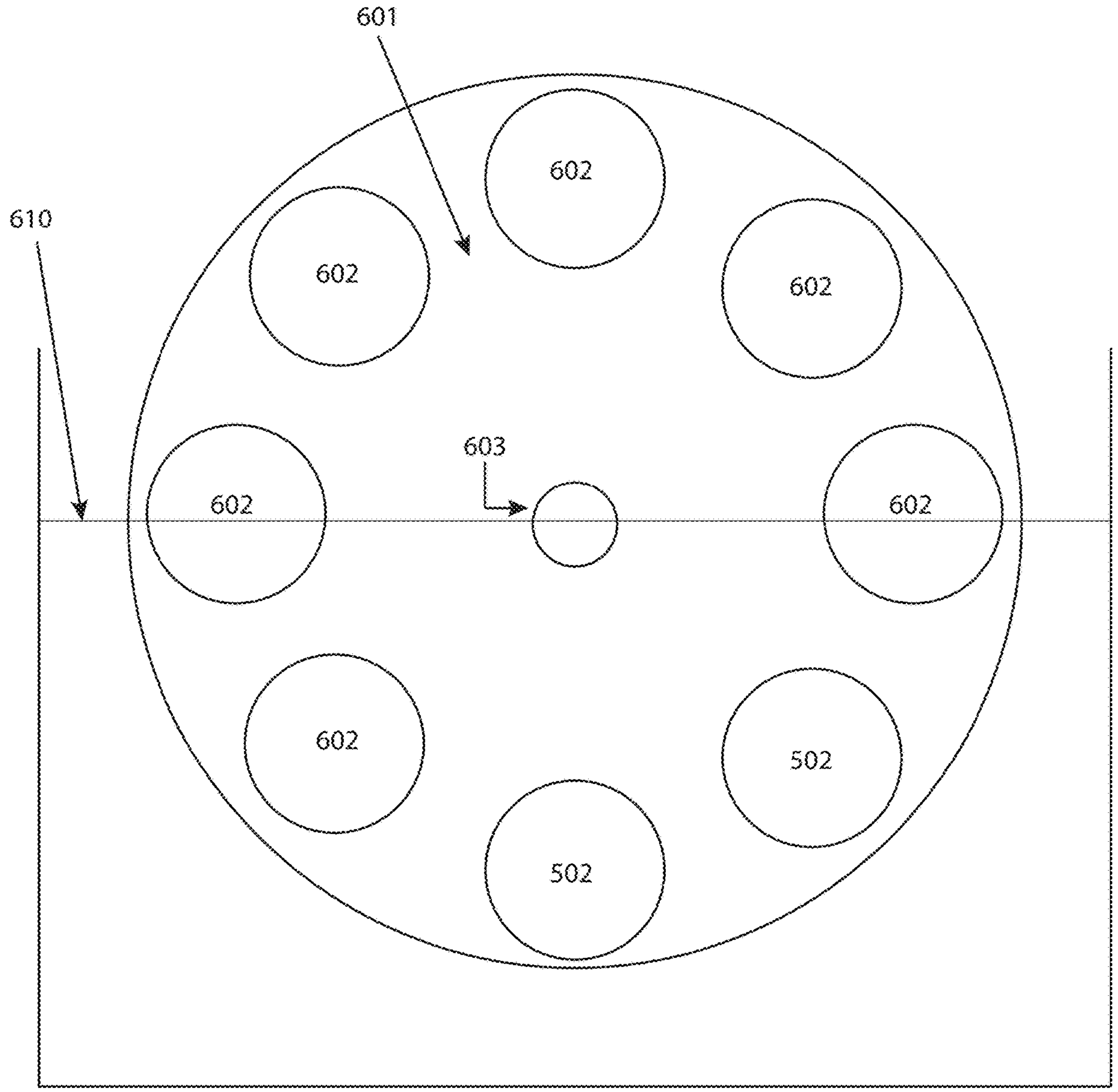
FIG. 6 shows the host plate of FIG. 4 partially submerged in a plating bath.

FIG. 6 shows a host plate 601 partially submerged in a plating bath 610. The partial submerged in plating bath 610 may be such that only one patterned plate 602 will be submerged at one time or so great that only the patterned plate is not in the plating bath 610 at any time if the spacing the patterned plated allows it.

Figure 7:
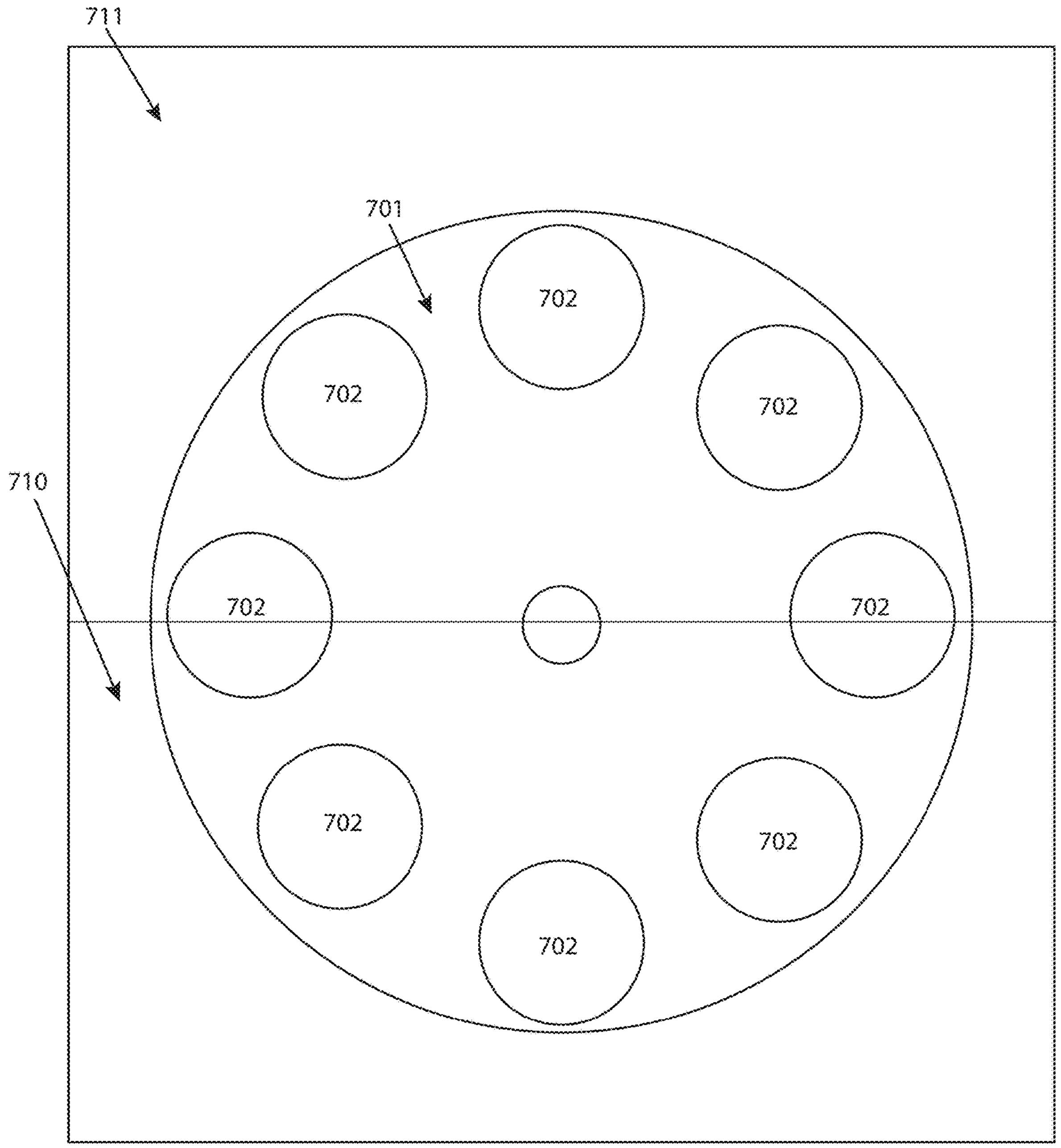
FIG. 7 shows the host plate of FIG. 4 partially submerged in a plating bath where the unsubmerged portion is encased in its own oxidative environment.

FIG. 7 shows host plate 701 partially submerged in plating bath 710 in an oxidizing environment 711, which is defined as the enclosed area enveloping the non-submerged portion of the host plate. Here the oxidizing environment is an ozone environment at forty-five Celsius and ninety-five percent humidity.

In the preferred embodiments of the present invention in general, the oxidizing chamber is a controlled environment of gasses chosen to oxidize the metal, for instance, an ozone air mixture. These gasses may be blown or otherwise forced over the portion of the plate to be oxidized; the gasses may be free flowing, in a set environment around the plate, or both. The environment may be heated or pressurized to increase the rate of oxidation.

Figure 8:
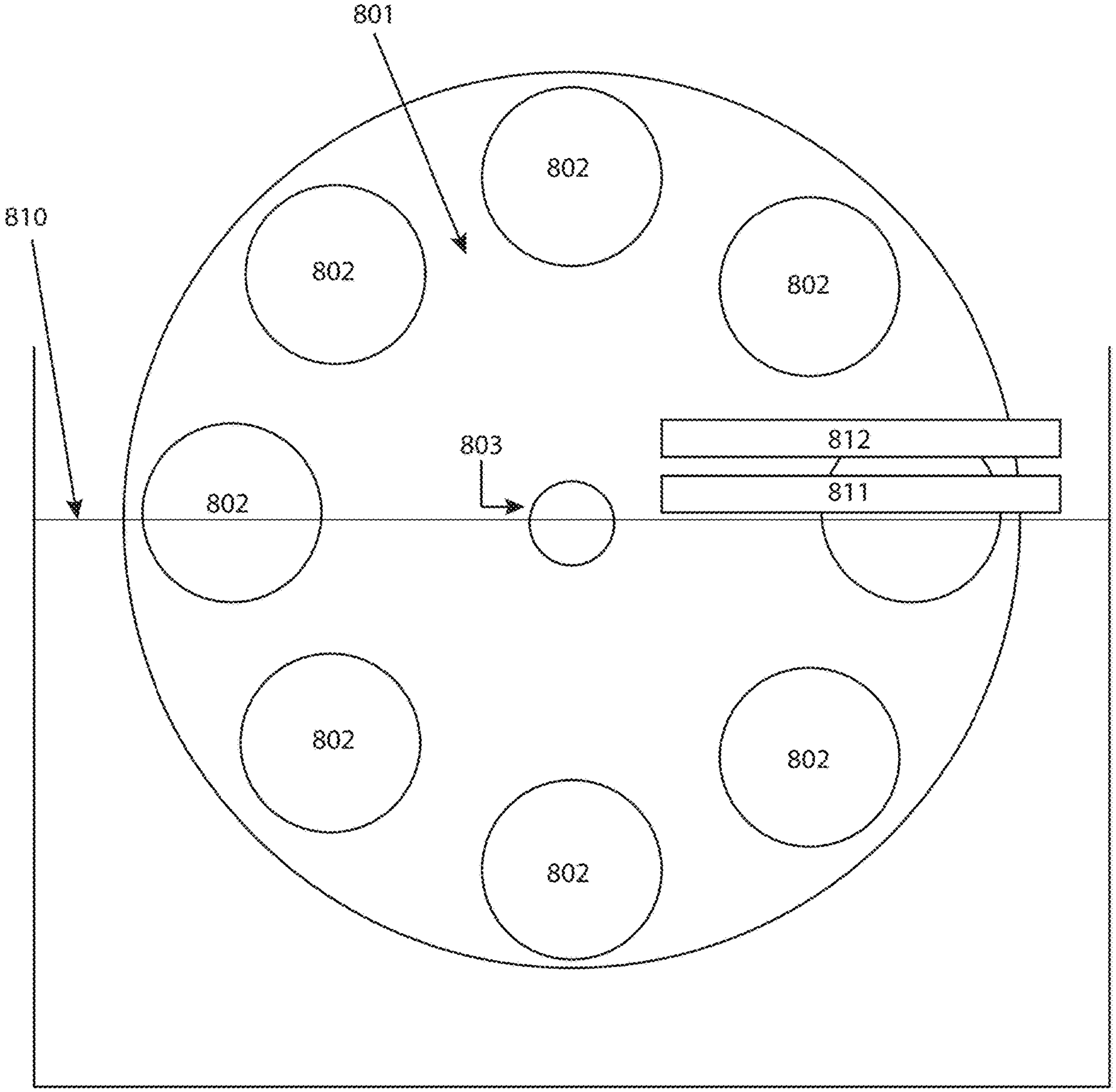
FIG. 8 shows the host plate of FIG. 4 partially submerged in a plating bath and having a drying station and a rinsing station (these stations may be put on either or both sides).

This oxidizing environment is allowed to encompass all exposed portions of the host plate. However, this does not preclude the ability to add stations, including drying, rinsing, and heating stations. FIG. 8 shows a host plate 801 having a rinsing station 812 so that as a patterned plate 802 rises out of the plating bath 810 is rinsed off. After the rinsing station 812 is a drying station 813, which incorporates an air jet to blow off the remaining rinse solution from rinse station 812. Although for the host plate embodiment, it is easily possible to have an oxidizing environment, the layering of silica may require a silica deposit environment that is enclosed, as shown in the chain embodiment.

Figure 9:
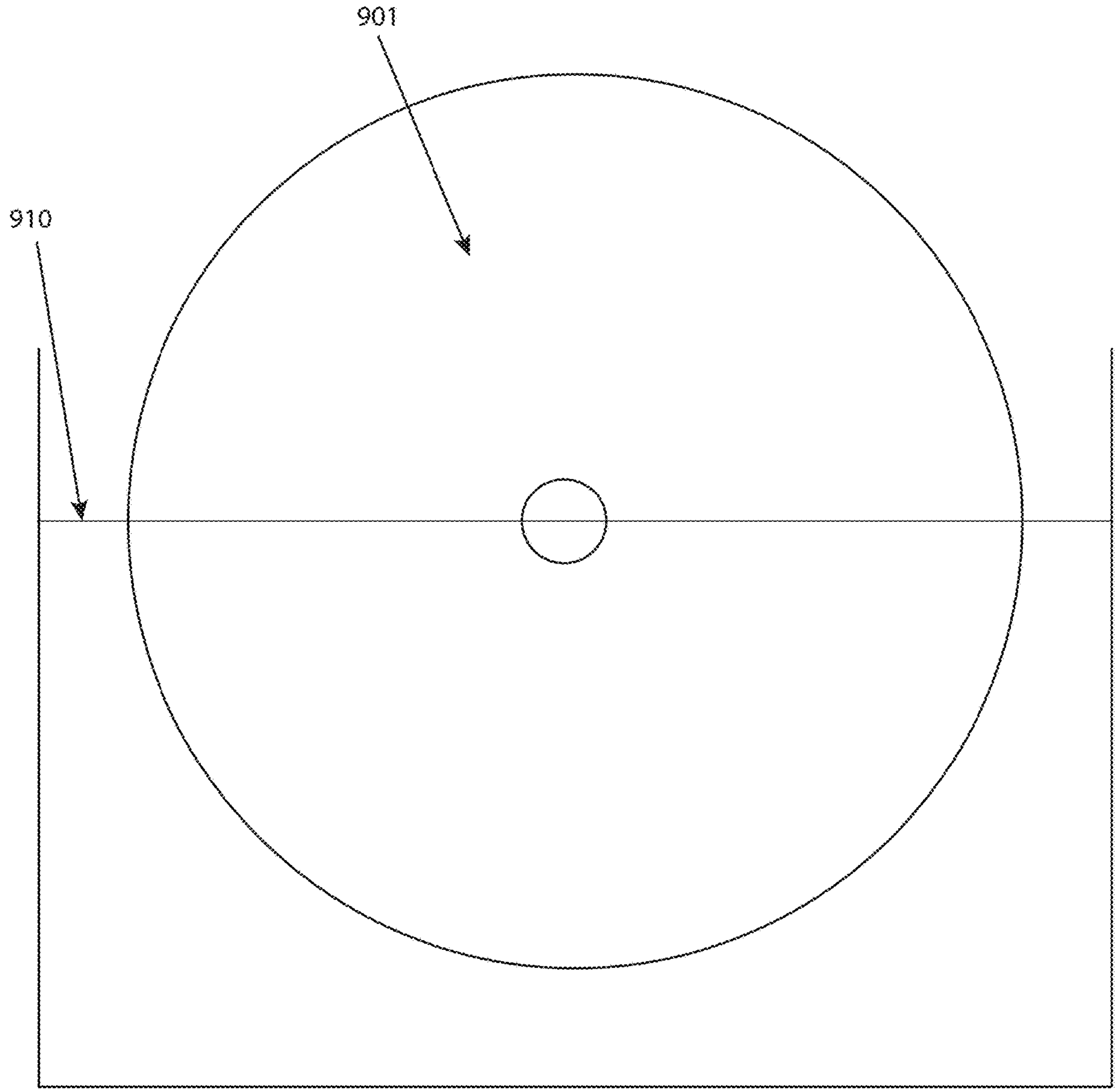
FIG. 9 shows a patterned plate partially submerged in a plating bath without a host plate.

A patterned plate may itself be partially submerged into a plating bath with the remaining portion placed into an oxidizing environment, and this embodiment is referred to as a patterned plate embodiment. FIG. 9 shows a patterned plate 901 partially submerged in a plating bath 910 with the remaining portion enclosed in an oxidizing environment 911. Here patterned plate 901 is spun, which moves the portion receiving a metal from the plating bath to the oxidizing layer, where the oxidizing layer is then formed, the oxidized layer is then submerged in the plating bath, and this process is repeated according to the number of layers desired.

In each of these embodiments, the chain, the host plate, and the patterned plate embodiment, plating occurs by passing a patterned plate or a portion of the patterned plate through a plating environment. The rate the plate passes through the environment is called a passing rate. This passing rate is typically consistent through environments. Therefore, the plating rates of the environments are tuned to generate the desired layer thickness given the desired passing speed of the patterned plates.

As a plate is spun or otherwise passed between two environments, there will be a ratio of plated metal to metal insulation according to the passing speed of the plate and the plating speed of each environment. Therefore, by controlling variables such as the rate of layer formation and spin speed, the layer thickness is controlled. Control of the plating rates is especially important as within each layer, there must be a layer of proper thickness to give the layer the properties needed to achieve the desired performance for the magnetic core. The desired core properties will be controlled by the design considerations of the component in which the magnetic core will be included, such as transformers and inductors. This control is especially important as the insulation layer is not supposed to be thick or provide a perfect delineation between metal layers of the magnetic core, and therefore precision is important.

In the preferred embodiments, the insulation layer will not provide a complete and perfect barrier between the metal layers. In fact, in the preferred embodiments, the amount of insulation layer by surface area is 85%, 90%, 95%, and 99% or any such number between 79% and 100%, depending on the needs of the embodiment. The benefit of the imperfect coverage of the surface area is that it allows the metal layers to bond directly to each other through the insulation layers. This eliminates intermediary steps between the plating of the metal and the plating of the insulation. The insulation layer still will greatly reduce the formation of eddy currents. Given the quickness and thinness of the layers plated in this manner, this becomes a cheap, scalable way to provide effective magnetic cores that can handle high-frequency current and are applicable to both the electronics and microelectronics industry.

In preferred embodiments of the present invention, utilizing an oxidizing environment, the oxidation environment is typically an ozone environment. The ozone plating environment will oxidize the top portion of the metal layer plates at a non-linear speed, such that it provides rapid initial oxidation and then suddenly slows. This allows for nearly identical oxide plating thickness over a wide range of spin speeds. In a preferred embodiment of a nickel, nickel-iron, and nickel, oxide core, the ozone will create an imperfect oxidation layer at 10 angstroms nearly instantly, and then it slows considerably, which results in a 1 nm oxidation layer over a range of spin speeds. Even without ozone, these numbers occur for nickel in an oxidation environment of ozone at forty-five degrees Celsius with a relative humidity of 95%. However, alternate metals like iron require different conditions (more heat and time) to rapidly form an oxidation layer.

The steadiness and rapidness of the nickel oxide plating speed up until 1 nm is useful as well. As resistivity levels may follow a curve so that too little or much oxidation results in a loss of resistivity, it grants forgiveness in passing speed as a range of passing speeds will effectively provide the same level of oxidation. Small oxide layers also do not affect the magnetic properties of magnetic flux guiding layers as well. However, because the insulation layer is so small, in several embodiments, more layers are needed in the core overall. One such embodiment includes 4000 layers coming from two hours of plating time at two seconds per layer. However, in cores with small oxide layers, variables like temperature have a large effect on resistivity. To mitigate this, in several embodiments, the nickel-oxide layer thickness is set for optimization at certain temperatures.

In a nickel, nickel-iron, and nickel-oxide plating process, it may seem that the nickel will negatively affect the oxidation of the iron, competing with it for oxygen molecules. However, in practice, the nickel highly outcompetes the iron for oxygen molecules resulting in a nickel oxide layer almost devoid of iron oxide.

In a silica deposit process, the silica is actually deposited onto the metal layer as opposed to an oxidation step which oxides a top portion of the metal layer. Due to the use of the CCVD process to deposit silica, the silica will be propelled by the combustion and fall randomly like snow onto the metal layer. The amount of silica that falls can easily be controlled by controlling the amount of silica precursor that is combusted.

Therefore, in terms of plating environments, it can be seen that an oxidizing process will typically present a layer of the same thinness enabling a large range of passing speeds to accommodate a thin imperfect oxide layer. This makes it ideal to form cores with consistent insulation thickness at a range of metal layer thicknesses even by directly plating metal-oxide-metal. It can further be seen that a silica deposit process can be highly controlled for the same effect by allowing for fine-tuning of the silica thickness over a large range of passing speeds. This gives the option with either the silica or the oxidation method of plating an insulator layer to focus on the plating rate of the plating bath in conjunction with the passing speed of the plates.

At set deposit rates, increasing passing speed will cause the layers to be thinner and decreasing passing speed will cause the layer thickness to increase. When a plate will pass through multiple, for example, two or three different plating environments at the same speed, the layer thickness of the resulting layers will be different unless both environments plate at the same speed. The layer thickness can also be achieved by controlling the rate each plating environment plates at. Therefore, the layer thickness will be a balance between speed and deposit rate. However, passing speed itself has many important factors to consider and introduces problems that must be solved.

Figure 10:
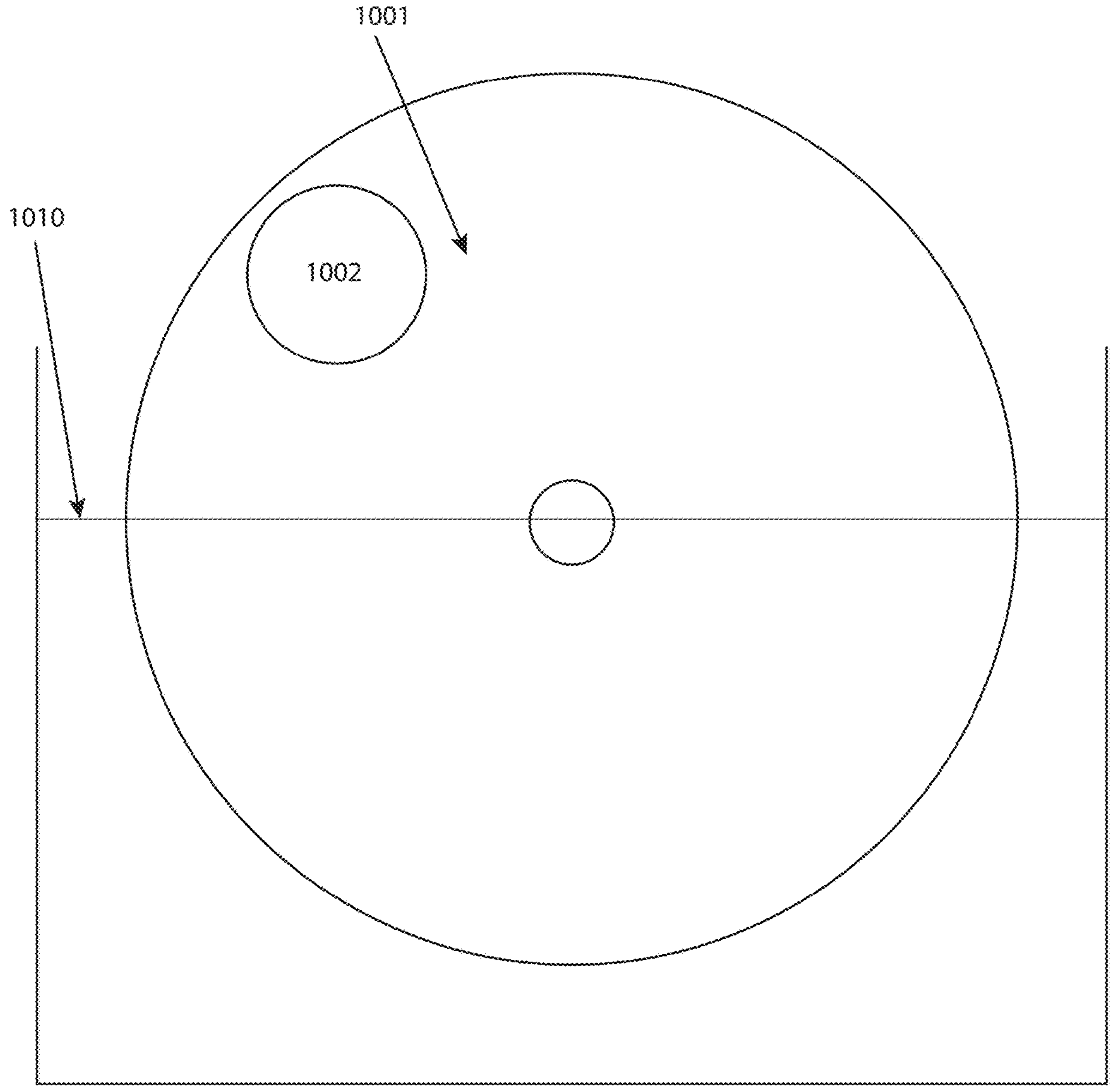
FIG. 10 shows a host plate having a singular patterned plate as a demonstrative embodiment where passing speed may vary by environment.

It is important to note that the passing rate of patterned plates will be the same for a given host plate or chain if they are on the same host plate or chain. The host plate or chain restricts the ability of the patterned plates to be moved through the plating environments at different speeds. To practically escape this limitation, the host plate or chain can have a patterned plate in a plating environment without having the patterned plate or another patterned plate in another plating environment. An example of such a plate is shown in FIG. 10, where host plate 1001 in bath 1010 has one patterned plate 1002, allowing it to separate the passing rates through environments. However, in cases where a patterned plate must be in a plating environment while a patterned plate is in another plated environment then, the passing rate will be related to each other.

This is a problem because, in the preferred embodiments, the oxide layers are thinner than the metal layers. Therefore, for most practical purposes, the passing rate of patterned plates on a host plate or chain will be the same and not altered for some patterned plates on the chain loop or host plate.

In the preferred embodiments, which involve passing through at least two different environments, especially a liquid plating bath and a gas-based oxidizing environment, passing speed introduces concerns as plate or portion of the plate transfers between environments.

As the patterned plate leaves the plating bath, the surface tension of the plating bath means that some of the bath liquid may rise out of the plating bath. Further, as the plate passes into the bath, it disrupts the surface of the bath, which causes it to become uneven. The speed of the passing affects both of these factors, and both of these factors reduce the plating uniformity of the subsequent layers. However, by increasing the passing rate of the plate through the bath solution, some solution can be allowed to rise along with the spinning plate, and the impact of an uneven bath surface is reduced. Also, means can be introduced to remove the excess bathing material from clinging to the plate, such as by provision of a barrier, for example, polypropylene balls.

Figure 11:
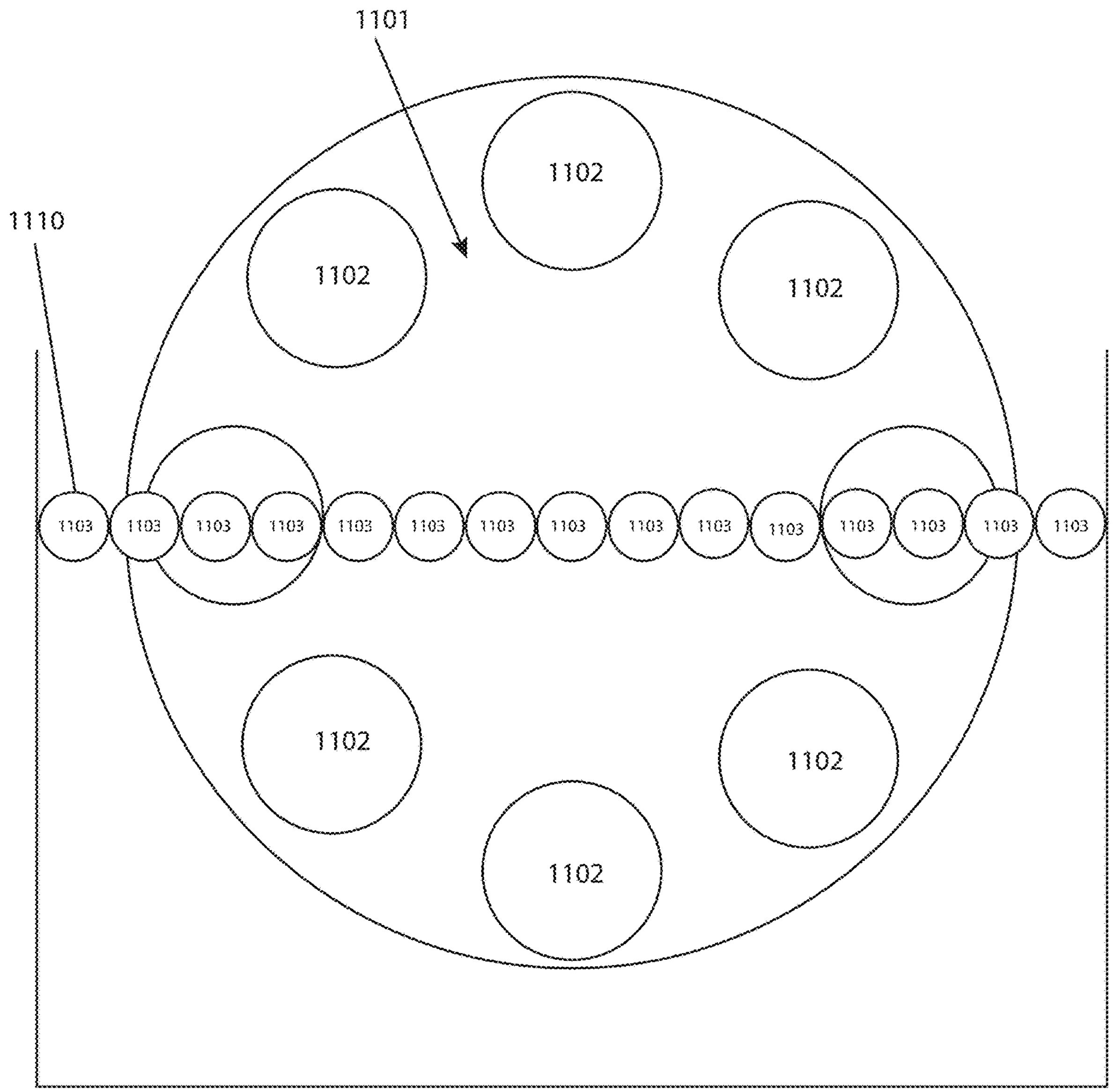
FIG. 11 shows plating bath having polypropylene balls floating on its surface which present a barrier to rising plating bath that clings to a plate rising out of the bath.

FIG. 11 shows a series of polypropylene balls 1103 floating on the surface of plating bath 1110. These are packed enough to contact the surface of host plate 1101 and its respective patterned plates 1102 to provide a physical barrier capable of reducing the amount of plating bath brought up by the host plate. These balls can be used in the chain, host plate, or patterned plate embodiments of the present invention.

Further, an introduction of a rinse or a drying process of both may help eliminate excess plating solution from being carried into the oxidizing environment on the patterned plate surface. In several embodiments, the drying process may be utilized without the use of the rinsing process. The rinsing process may also be used without the drying process in several embodiments and vice versa. These stations may be placed anywhere outside of the plating bath along the path of the host plate.

The passing of a plate through a plating bath may itself cause bubbles to form in the plating solution, these bubbles negatively affect the deposit of metal from the bath. These bubbles can be significantly reduced by alternating the passing direction of the plate through the solution after plating a layer. For example, a chain loop causes a metal layer to be plated, an insulation layer to be deposited, and a subsequent metal layer to be plated in series, then the chain loop reverses the passing direction. Alternating passing directions is also useful with host plate and patterned plate embodiments.

In a preferred host plate embodiment that produces a nickel and nickel oxide core, the ideal spin speed is 300 rpm for a 1 nm nickel oxide layer. However, by increasing the desired thickness up to 10 nm, 20 nm, 175 nm, or 200 nm, or any size in-between, the passing speed can be decreased, and spin speeds down to 0.5 rpm have been calculated to be practical. In a preferred embodiment, having a nickel, nickel-iron, nickel oxide layered core, where the nickel oxide layers are 20 nm, allows for a thicker nickel-iron layer. This thicker nickel-iron layer results in lower magnetic flux concentration at the border of the nickel oxide. Therefore, providing different spin speeds can control the resistivity and/or reluctance of the core by controlling layer thickness.

The thickness of the oxide layer is especially important because it relates to the reluctance of the oxide layer. In a preferred embodiment of the present invention, which is a nickel, nickel-iron, and nickel-oxide layered core formed by the plating process, the nickel oxide layer may have a resistivity of anywhere 135 ohms/cm to 75,000 ohms/cm and may be found to exceed those boundaries to any number in alternative embodiments of applications as purity changes. The purity of the oxide layer is controlled in part by time spent in the plating environment. Further, different oxide layer thicknesses may provide similar numbers even at different purity levels.

Although getting the first nanometer of nickel oxide is far less than a second, the plating rate for NiFe appears to be around 3-5 nm per second at 70 C at 12-16 mA/cm2. These are two different plating rates; however, they can be balanced, and in an embodiment of the present invention having NiFe, Ni, and NiO layers, a nickel-iron and a nickel-oxide ratio of 1:3 to 1:5 could be achieved with plate spin at 30 rpm. A preferred embodiment of the present invention would have less the iron, and this would be achieved by spinning at 15 rpm (which would still get the 1 nm of oxide as the after 1 nm oxidation is greatly slowed) to get a ratio including and between 1:6 to 1:10 oxide to iron. An alternate embodiment would spin at 60 rpm and provide for a 1.5 to 2.5 nm NiFe layer.

Ideal metal to oxide thickness levels includes, but are not limited to: 0.3 nm of nickel-oxide and 0.3 microns of nickel for a core; 0.5 nm of nickel-oxide and 0.5 microns of nickel-iron for a core; and 2 nm of nickel-oxide and 5 microns of nickel.

Figure 12:
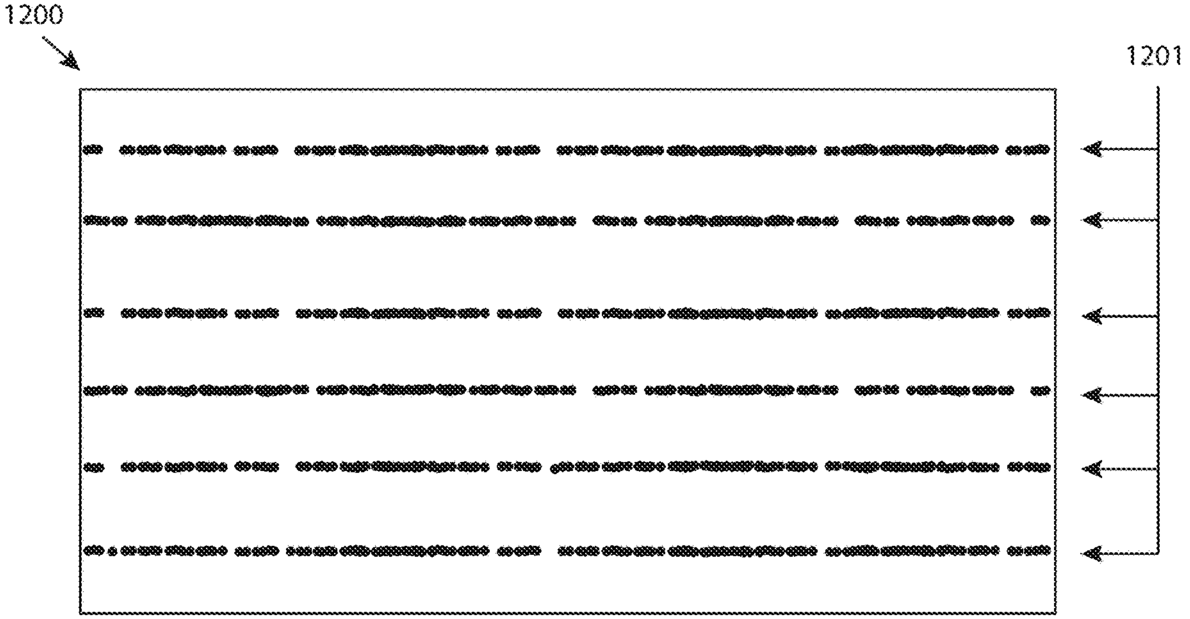
FIG. 12 shows a magnetic core with imperfect insulation layers as produced by the methods of the present invention.

The resulting core 1200 from the methods above will have a series of imperfect insulation layers 1201 these are layers that do not provide full coverage of the metal layer onto which they are plated, as shown in FIG. 12.

To further control the plating of the metal layers, the plating rate of the plating bath may be controlled. Two key variables of the plating bath are the voltage and pH of the plating bath. In the preferred embodiments, the metal plating portion is a bath of plating solution chosen according to the metal desired. The bath should be a pH high enough such that a metal oxide layer or other insulation layer is not dissolved when submerged in the bath, but low enough to prevent the formation of particulates in the bath. This pH must be balanced according to the voltage of the bath.

Figure 13:
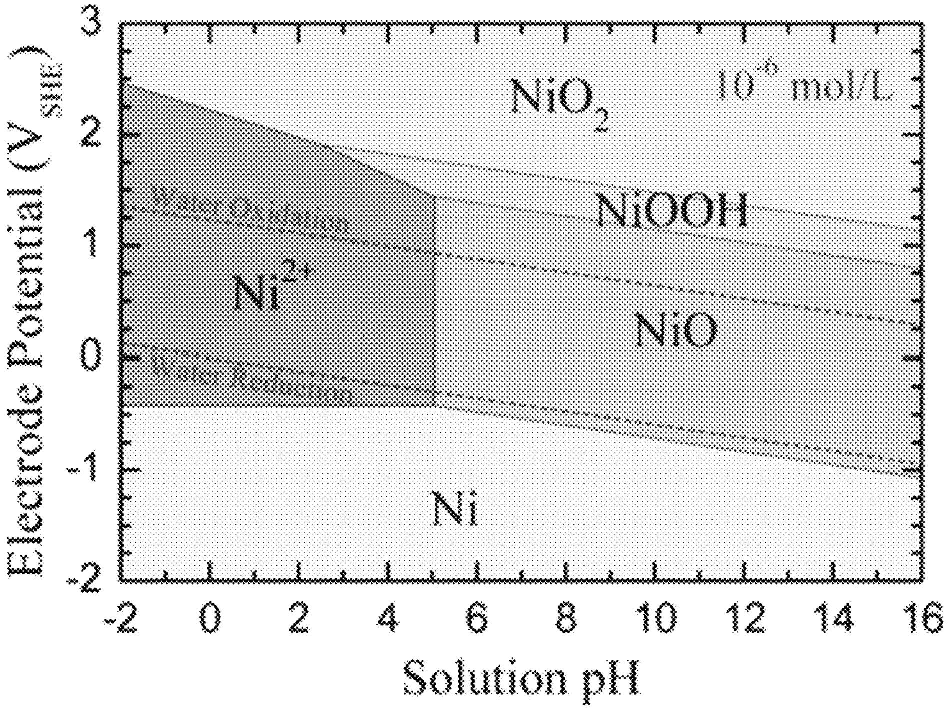
FIG. 13 shows a pourbaix diagram for nickel and nickel-oxide electroplating bath.

For cores utilizing oxide insulation layers, the balance of voltage and pH can be derived from the relevant pourbaix diagrams for the metal and oxide to be plated. A pourbaix diagram for nickel is shown in FIG. 13.

This is a graph of electrostatic potential over pH, and the lines of the graph show the point at which fifty percent of the material is in one state and the remaining fifty percent of the other state. It can be seen that nickel is formed at negative voltage potentials, but as the pH of the solution increases, the voltage must drop further to prevent the formation of NiO. This NiO would be formed as precipitants in the solution, which may need to be filtered out. We can see from this graph that at around 4.5 to 5.5 pH the electrical potential can be closer to zero than at any other point on the graph. This pH range provides the biggest working range of voltages for the plating bath. However, in the plating bath, to readily ensure only nickel is plated, the electrostatic potential can be dropped deep into the negative values. Therefore, in a nickel (Ni) and nickel oxide (NiO) core example, the ideal pH is 5 for the formation of NiO, but a pH of 4.5 to 5.5 may work.

There are also physical solutions, such as reducing the time that a patterned plate spends in the plating bath to reduce the time for precipitate formation or to reduce the amount of oxide dissolved, depending on the chosen pH of the solution. The pH of the solution could be increased if the filtration of the plating bath is increased. If the time the NiO layer spends in the plating bath is reduced so that it does not significantly dissolve, the pH can be lowered.

To handle precipitate formation, the preferred embodiments include a filtration system to prevent precipitate from impacting the deposit processes. However, some alternate embodiments do not include the filtration system. by balancing pH, voltage, filtration, and the time of the metal oxide in the bath, solutions across a range of pH values may be used while still enabling the preservation of the oxide layer.

In the preferred embodiments with a plate spinning between two environments, it is good to control all plating environments so that they all provide the desired layer thickness as the plate spins at a constant rate. By changing the deposit speed of the plating bath or oxidizing environment, the rate of formation of the respective layer is changed, and therefore, these environments can be controlled to change layer thickness while keeping the passing speed constant.

The drawings and figures show multiple embodiments and are intended to be descriptive of particular embodiments but not limited with regard to the scope or number, or style of the embodiments of the invention. The invention may incorporate a myriad of styles and particular embodiments. All figures are prototypes and rough drawings: the final products may be refined by one of ordinary skill in the art. Nothing should be construed as critical or essential unless explicitly described as such. Also, the articles “a” and “an” may be understood as “one or more.” Where only one item is intended, the term “one” or other similar language is used. Also, the terms “has,” “have,” “having,” or the like are intended to be open-ended terms. In any such item incorporated by reference in any section of the provisional patent application where there is a definition contradictory to the definition laid out in the provisional patent application in material fully integrated into the application, the definition that is fully integrated into the text of the patent will control the meaning for the present invention.

The invention claimed is:

1. A magnetic core apparatus comprising;

an initial metal layer;

a least one oxide insulation layer having a series of imperfections and operationally bonded to the initial metal layer; and a subsequent metal layer operationally bonded to the initial metal layer through imperfections in the oxide insulation layer; and the subsequent metal layers and the oxide insulation layers repeat at least once in an alternating fashion.

2. The magnetic core apparatus of claim 1, wherein the total number of layers is 4000 or less.

3. The magnetic core apparatus of claim 1, wherein the metal layers are nickel and nickel-iron, and the oxide layers are nickel oxide.

4. The magnetic core apparatus of claim 3, wherein the ratio of the nickel layer thickness to the ratio of nickel-oxide thickness is of a range from 1:3 to 1:10.

* * * * *